United States Patent [19]

Davidson et al.

[11] Patent Number: 5,091,453
[45] Date of Patent: Feb. 25, 1992

[54] FLAME RETARDANT POLYMER COMPOSITION

[75] Inventors: Neil S. Davidson, Stirling; Kenneth Wilkinson, Dunblane, both of Scotland

[73] Assignee: BP Chemicals Limited, London, England

[21] Appl. No.: 506,787

[22] Filed: Apr. 10, 1990

[30] Foreign Application Priority Data

Apr. 21, 1989 [GB] United Kingdom ............... 8909070
Dec. 16, 1989 [GB] United Kingdom ............... 8928444

[51] Int. Cl.$^5$ .................................................. C08K 5/54
[52] U.S. Cl. ........................................ 524/269; 524/266; 525/100; 525/101; 525/102; 525/105
[58] Field of Search ................. 524/266, 269; 525/506, 525/100, 101, 102, 105

[56] References Cited

U.S. PATENT DOCUMENTS

| | | | |
|---|---|---|---|
| 4,209,566 | 6/1980 | Betts et al. | 428/389 |
| 4,247,446 | 1/1981 | Betts et al. | 260/42.42 |
| 4,273,691 | 6/1981 | MacLaury et al. | 260/23 S |
| 4,341,675 | 7/1982 | Nakamura | 524/266 |
| 4,387,176 | 6/1983 | Frye | 524/268 |
| 4,536,529 | 8/1985 | Frye et al. | 524/284 |
| 4,680,229 | 7/1987 | Betts et al. | 428/391 |
| 4,731,406 | 3/1988 | Itoh et al. | 524/436 |
| 4,767,580 | 8/1988 | Shingo et al. | 264/41 |

FOREIGN PATENT DOCUMENTS

| | | |
|---|---|---|
| 2241580 | 3/1975 | France . |
| 63-159455 | 7/1988 | Japan . |
| 63-159473 | 7/1988 | Japan . |
| 63-162739 | 7/1988 | Japan . |
| 63-183960 | 7/1988 | Japan . |
| 64-60642 | 3/1989 | Japan . |
| 1-141928 | 6/1989 | Japan . |

OTHER PUBLICATIONS

Finney, "New Silicone Technologies . . . ", Elastomerics, Mar. 1987, pp. 17-22.
Hartley et al. "New Silicone . . . ", Intl. Wire & Cable Sym. Proc., 1988, pp. 567-574.
Frye, "New Silicone Flame . . . ", pp. 235-239.
MacLaury et al., "Metals as Synergistic . . . ", Jour. of Applied Poly. Sci., vol. 30, 1985, pp.-461-472.
Schroll et al., "Use of Polymer-Bound . . . ", Jour. of Applied Poly. Sci., vol. 29, 1984, 3883-3899.
"Flame Retardant . . . ", Elastomerics, Aug. 1987, p. 43.
"Silicone Additive . . . ", Elastomerics, Jun. 1987, p. 39.
"Flame Retardants . . . ", 1989 Elseview Science, vol. 6, #3, p. 3.
"Polyolefin Acoustic . . . ", Chemical Week, Aug. 17, 1988, p. 18.
Patent Abstracts of Japan, vol. 12, No. 433(C-543) [3280], Nov. 15, 1988.
Patent Abstracts of Japan, vol. 12, No. 438 (C-544) [3285], Nov. 17, 1988.
Patent Abstracts of Japan, vol. 12, No. 191 (C-501) [3038], Jun. 3, 1988.
Patent Abstracts of Japan, vol. 11, No. 357 (C-458) [2804], Nov. 20, 1987.
Patent Abstracts of Japan, vol. 7, No. 43 (C-152) [1188], Feb. 19, 1983 & JP-A-57-195757 (Shinetsu K.K.)
Patent Abstracts of Japan, vol. 13, No. 293 (C-152) [3641], Jul. 6, 1989 & JP-A-1-87647 (Furukawa Electric).
Patent Abstracts Of Japan, vol. 12, No. 438 (C-544) [3285], Nov. 17, 1988 & JP-A-63-162739 (Furukawa Electric).
Patent Abstracts Of Japan, vol. 11, No. 357 (C-458) [2804], Nov. 20, 1987 & JP-A-62-129321.

*Primary Examiner*—Joseph L. Schofer
*Assistant Examiner*—Jeffrey T. Smith
*Attorney, Agent, or Firm*—Nixon & Vanderhye

[57] ABSTRACT

A flame retardant polymer composition which is substantially free of halogen compounds and of organometallic salts comprises (A) an organic polymer, at least 40% by weight of which is a copolymer of ethylene with one or more comonomers selected from the group consisting of alkyl acrylates, alkyl methacrylates, acrylic acid, methacrylic acid and vinyl acetate, (B) a silicone fluid or gum and (C) an inorganic filler which is a compound of a metal of Group II A of the Periodic Table of Elements but which is neither a hydroxide nor a substantially hydrated compound. Suitable inorganic fillers are magnesium oxide, magnesium carbonate and calcium carbonate, the latter being the most preferred. The compositions are particularly suitable for use in wire and cable applications.

10 Claims, No Drawings

FLAME RETARDANT POLYMER COMPOSITION

The present invention relates to flame retardant polymer compositions and in particular to flame retardant compositions comprising thermoplastic organic polymers.

Commercially available flame retardant polyolefin compositions contain relatively large quantities, typically 10 to 50% by weight, of an organic halide and an antimony oxide synergist, e.g. antimony trioxide. Concern has been expressed about the evolution of acidic and toxic compounds when such compositions are present in a fire.

It is also known to increase the flame retardancy of polymer compositions by incorporating into the compositions relatively large amounts, typically 50 to 60% or more by weight, of inorganic fillers which decompose endothermically liberating an inert gas at a temperature in the range 200° to 600° C.

Phosphorys based additive systems have also been used to improve the flame retardancy of polymer compositions. Such compositions are relatively expensive, may evolve toxic or acidic compounds in a fire and again require relatively high loadings to achieve adequate flame retardancy. They can also be difficult to handle and tend to absorb water.

Flame retardant additive systems which use silicone fluids have also been proposed for use in polyolefin compositions. For example, U.S. Pat. No. 4,387,176 discloses flame retardant thermoplastic compositions and masterbatch formulations effective for rendering thermoplastics flame retardant. A typical flame retardant composition could comprise 50 to 97 percent by weight of thermoplastic, 1 to 40 percent of a silicone base such as a linear silicone fluid or gum, 1 to 20 percent of a metal organic compound such as magnesium stearate and 1 to 20 percent of a silicone resin such as MQ resin which is soluble in the silicone base.

U.S. Pat. No. 4,273,691 discloses flame retardant compositions comprising by weight (A) 70 to 98% of polyolefin, (B) 1 to 10% of silicone and (C) 1 to 20% of Group IIA metal $C_{6-20}$ carboxylic acid salt.

Halogen-free flame resistant polyolefin compositions containing significant quantities of inorganic hydroxides are also known. For example, Japanese patent application JO 1060642 relates to compositions consisting of polyolefin as a major component, 30 to 100 parts by weight of one or more of aluminium hydroxide, calcium hydroxide and hydrotalcites, 10 to 40 parts by weight of one or more of magnesium oxide, magnesium carbonate and magnesium hydroxide and 1 to 10 parts of one more of red phosphorous, barium compounds, lead compounds and silicone oil. The total of these components not exceeding 125 parts by weight. The use of hydroxides, such as magnesium hydroxide, in flame retardant compositions to be used in electrical wire or cable is undesireable because they tend to adversely affect the electrical performance of such compositions.

The present invention relates to a flame retardant polymer composition which is substantially free of both organo-halogen compounds and organometallic salts. The flame retardant polymer composition according to the present invention is particularly suitable for use in electrical wire and cable.

Thus, according to the present invention a flame retardant polymer composition, which is substantially free of halogen compounds and of organometallic salts, comprises (A) an organic polymer at least 40 percent by weight of which is a copolymer of ethylene with one or more comonomers selected from the group consisting of $C_1$ to $C_6$ alkyl acrylates, $C_1$ to $C_6$ alkyl methacrylates, acrylic acid, methacrylic acid and vinyl acetate, (B) a silicone fluid or gum and (C) an inorganic filler which is a compound of a metal belonging to Group II A of the Periodic Table of the Elements but which is neither a hydroxide nor a substantially hydrated compound.

References to the Periodic Table of Elements in this specification should be taken to be references to the Table as published on the inside cover of Perry et al "Chemical Engineers' Handbook" 5th edition 1973, McGraw-Hill.

The organic polymer comprises at least 40%, preferably at least 60%, by weight of a copolymer of ethylene with one or more comonomers selected from the group consisting of alkyl acrylates, the alkyl group having from 1 to 6 carbon atoms; alkyl methacrylates, the alkyl group having from 1 to 6 carbon atoms; acrylic acid; methacrylic acid and vinyl acetate. The term "copolymer" as used in this context includes graft copolymers in which one or more of the comonomers is grafted onto a polymer backbone such as, for example, acrylic acid-grafted polyethylene. In addition to ethylene and the defined comonomers, the copolymers can also contain additional monomers. For example, the copolymers can contain up to 10% by weight of an olefin such as propylene. Preferably, the organic polymer comprises ethylene/methyl acrylate copolymer, ethylene/ethyl acrylate copolymer, ethylene/butyl acrylate copolymer, or ethylene acrylic acid copolymer and more preferably the organic polymer consists essentially of one or more of these copolymers.

Examples of polymers which can be included in the organic polymers used to make the flame retardant compositions according to the present invention include polyolefins such as, for example, homopolymers and copolymers of ethylene, propylene and butene and polymers of butadiene or isoprene. Suitable homopolymers and copolymers of ethylene include low density polyethylene, linear low density polyethylene, and very low density polyethylene. Other suitable polymers include polyesters, polyethers and polyurethanes. Elastomeric polymers may also be used such as, for example, ethylene-propylene rubber (EPR), ethylene-propylene-diene monomer rubbers (EPDM), thermoplastic elastomer rubbers (TPE) and nitrile butadiene rubber (NBR). Silane-crosslinkable polymers may also be used i.e. polymers prepared using unsaturated silane monomers having hydrolysable groups capable of crosslinking by hydrolysis and condensation to form silanol groups in the presence of water and optionally a silanol condensation catalyst. The silane-crosslinkable polymer can be for example a copolymer of ethylene and an unsaturated silane monomer such as vinyl trialkoxysilane produced by copolymerising the monomers in a polymerisation reactor or by grafting the silane monomer onto a polyethylene backbone.

Silicone fluids and gums suitable for use in organic polymer compositions are known and include for example organopolysiloxane polymers comprising chemically combined siloxy units selected from the group consisting of $R_3SiO_{0.5}$, $R_2SiO$, $R^1SiO_{1.5}$, $R^1R_2SiO_{0.5}$, $RR^1SiO$, $R^1_2SiO$, $RSiO_{1.5}$ and $SiO_2$ units and mixtures thereof in which each R represents independently a saturated or unsaturated monovalent hydrocarbon radical, and each $R^1$ represents a radical such as R or a radical selected from the group consisting of a hydrogen atom, hydroxyl, alkoxy, aryl, vinyl or allyl radicals. The organopolysiloxane has a viscosity of approximately 600 to $300 \times 10^6$ centipoise at 25° C. An example of an organopolysiloxane which has been found to be suitable is a polydimethylsiloxane having a viscosity of approximately $20 \times 10^6$ centipoise at 25° C. The silicone fluid or gum can contain fumed silica fillers of the type commonly used to stiffen silicone rubbers e.g. up to 50% by weight. The amount of silicone fluid or gum included in the composition according to the present invention can be from 0.5 to 100, preferably from 2 to 45, parts by weight per hundred parts by weight of the organic polymer.

The inorganic fillers suitable for use in the flame retardant compositions according to the present invention are inorganic compounds of a metal of Group II A of the Periodic Table of Elements which are not hydroxides nor substantially hydrated compounds. The inorganic fillers are preferably compounds of magnesium and/or calcium. Examples of suitable inorganic fillers are calcium carbonate, magnesium carbonate, magnesium oxide and huntite 2 [$Mg_3$ Ca ($CO_3$)$_4$]. Although the inorganic filler is not a hydroxide, it can contain small amounts of a hydroxide typically less than 5% by weight of the filler, preferably less than 3% by weight. For example, there may be small amounts of magnesium hydroxide in magnesium oxide. Also, although the inorganic filler is not a substantially hydrated compound, it can contain small amounts of water, usually less than 3% by weight of the filler, preferably less than 1.0% by weight.

Inorganic fillers such as magnesium oxide and calcium carbonate are not generally considered to be good flame retardants. However, the flame retardant compositions according to the present invention not only have good flame retardant properties, they also have better electrical properties than compositions containing fillers such as magnesium hydroxide. The compositions according to the present invention are therefore particularly useful as bedding compounds or insulation and jacketing materials for wire and cable. Preferably, the inorganic filler used in the flame retardant composition according to the present invention comprises at least 50% by weight of calcium carbonate. More preferably, it is substantially all calcium carbonate.

The amount of inorganic filler included in the compositions according to the present invention can be from 10 to 250, preferably 25 to 100 parts by weight per hundred parts by weight of the organic polymer.

The inorganic filler will generally have an average particle size of less than 50 micron, preferably less than 5 micron and most preferably about 0.5 to 2.0 microns.

Although the compositions according to the present invention are substantially free of organometallic salts, the inorganic filler may comprise a filler which has been surface treated with a carboxylic acid or salt to aid processing and provide better dispersion of the filler in the organic polymer. Such coatings conventionally comprise no more than 2% by weight of the filler. Preferably, the compositions according to the present invention contain less than 0.5% by weight of a carboxylic acid salt.

In addition to the organic polymer, silicone fluid and inorganic filler, the compositions according to the present invention can contain additional ingredients such as, for example, antioxidants and small amounts of other conventional polymer additives.

The compositions according to the present invention may be crosslinkable. It is well known to crosslink thermoplastic polymer compositions using crosslinking agents such as organic peroxides and the compositions according to the present invention can contain a crosslinking agent in a conventional amount. Silane-crosslinkable polymers can contain a silanol condensation catalyst.

Suitable amounts of the components of the flame retardant compositions according to the present invention have been given above. However, it will be apparent to the person skilled in the art that the proportions to be used should be selected to give the required balance of properties, in particular to achieve a balance between the flame retardancy and the physical properties of the compositions. It has been found that a composition comprising about 2 to 8% by weight of a polydimethlysiloxane, about 15 to 50% by weight of calcium carbonate and the balance being an ethylene/ethyl acrylate copolymer provides a good balance of properties.

The flame retardant polymer compositions can be prepared by mixing together the organic polymer, the silicone fluid and the inorganic filler using any suitable means such as conventional compounding or blending apparatus, e.g. a Banbury mixer, a 2-roll rubber mill or a twin screw extruder. Generally, the composition will be prepared by blending them together at a temperature which is sufficiently high to soften and plasticise the organic polymer, typically a temperature in the range 120° to 300° C.

The flame retardant compositions according to the present invention can be used in many and diverse applications and products. The compositions can for example be moulded, extruded or otherwise formed into mouldings, sheets, webbing and fibers. As already mentioned, a particularly important use of the flame retardant compositions according to the present invention is for the manufacture of wire and cables. The compositions can be extruded about a wire or cable to form an insulating or jacketing layer or can be used as bedding compounds. When used as an insulation layer, the compositions are preferably crosslinked.

The invention is illustrated by the following examples.

EXAMPLES 1 TO 8

Compositions according to the present invention were prepared by blending together an organic polymer, a silicone gum and an inorganic filler in the proportions indicated in Table 1. The silicone gum used was trimethyl silyl chain-ended poly(dimethyl siloxane) gum. The organic polymer used was an ethylene-ethyl acrylate copolymer having a nominal melt index (190° C., 2.16 kg) of 1.0 g/10 min and an ethyl acrylate content of about 20% sold by BP Chemicals under the trade designation Novex LE 1810 (Novex is a trade mark). The inorganic fillers used were as follows:

$CaCO_3$-1—an uncoated calcium carbonate having an average particle size of 0.7 micron, sold under the trade designation Setacarb OG (SETACARB is a trade mark)

$CaCO_3$-2—a stearate-coated calcium carbonate having an average particle size of 1.0 micron, sold under the trade designation Hydrocarb 95T (HYDROCARB is a trade mark)

$CaCO_3$-3—an uncoated calcium carbonate having an average particle size of 5 microns, sold under the trade designation Omya BL (OMYA is a trade mark)

CaCO$_3$-4—a stearate-coated calcium carbonate having an average particle size of 5 microns, sold under the trade designation Omya BLH.

MgO—an uncoated magnesium oxide having an average particle size of 3.5 microns, sold by Steetly Refractories under the trade designation Anscor P (ANSCOR is a trade mark)

MgCO$_3$—an uncoated magnesium carbonate having an average particle size of 2.0 microns.

The compositions were prepared by blending the components at a temperature above the melt temperature of the organic polymer. The limiting oxygen index (LOI) of each composition was determined, to the nearest 1% oxygen, according to standard test method ASTM D2863-77 using as the ignition source a modified Ronson Hi-Heat butane gas blowtorch (supplied by Stanton Redcroft) set to give a 20 mm flame and the flame was applied to the top surface of the test specimen for 20 seconds. (Ronson and Hi-Heat are trade marks). The limiting oxygen index is the minimum concentration of oxygen in a mixture with nitrogen which allows self-sustained burning of the sample. The results are given in Table 1.

TABLE 1

| Example | Composition (% by wt) | | | Type of Filler | LOI |
|---|---|---|---|---|---|
| | Polymer | Silicone fluid | Filler | | |
| 1 | 72 | 8 | 20 | CaCO$_3$-1 | 30.0 |
| 2 | 72 | 8 | 20 | CaCO$_3$-2 | 33.0 |
| 3 | 72 | 8 | 20 | CaCO$_3$-3 | 27.5 |
| 4 | 72 | 8 | 20 | CaCO$_3$-4 | 30.5 |
| 5 | 54 | 6 | 40 | CaCO$_3$-2 | 34.5 |
| 6 | 72 | 8 | 20 | MgO | 28.0 |
| 7 | 54 | 6 | 40 | MgO | 32.0 |
| 8 | 72 | 8 | 20 | MgCO$_3$ | 27.0 |

EXAMPLES 9 TO 13 AND COMPARATIVE EXAMPLE A

Compositions according to the present invention were prepared by blending the same ethylene-ethyl acrylate copolymer as used in Examples 1 to 8 with a poly(dimethyl-siloxane) gum containing nominally 0.2 mole % vinyl groups and a stearate coated calcium carbonate having an average particle size of 1.5 microns, sold under the trade designation OMYA EXH1. The compositions were prepared and tested as described in Examples 1 to 8 and the proportions of the components and the LOI of each composition are given in Table 2.

For comparison, the LOI of a blend of the same ethylene-ethyl acrylate and calcium carbonate with no silicone fluid was determined and is also included in Table 2.

TABLE 2

| Example | Composition (% by wt) | | | LOI |
|---|---|---|---|---|
| | Polymer | Silicone fluid | CaCO$_3$ | |
| 9 | 54.5 | 1.0 | 44.5 | 30 |
| 10 | 53.6 | 2.5 | 43.9 | 34 |
| 11 | 52.2 | 5.0 | 42.8 | 36 |
| 12 | 49.5 | 10.0 | 40.5 | 36 |
| 13 | 66.6 | 5.0 | 28.4 | 36 |
| A | 55 | — | 45 | 25 |

EXAMPLES 14 TO 24

The same silicone fluid and the same calcium carbonate as used in Examples 9 to 13 were blended with other organic polymers. The compositions were prepared and tested as described in Examples 1 to 8 and the proportions of the components and the LOI of each composition are give in Table 3.

EMA-I—an ethylene/methyl acrylate copolymer having a nominal melt index (190° C., 2.16 kg) of 6.0 g/10 mins and a methyl acrylate content of 20% sold by Exxon under the trade designation TC120.

EMA-II—an ethylene/methyl acrylate copolymer having a nominal melt index (190° C., 2.16 kg) of 2 g/10 mins and a methyl acrylate content of 20% sold by Exxon under the trade designation TC110.

EBA-I—an ethylene/butyl acrylate copolymer having a butyl acrylate content of 17% sold by Orkem under the trade designation Lotader 3400 (LOTADER is a trade mark)

EAA-I—an ethylene/acrylic acid copolymer having a nominal melt index (190° C., 2.16 kg) of 1.5 g/10 min and an acrylic acid content 9% sold by Dow under the trade designation Primacor 1410 (PRIMACOR is a trade mark).

EAA-II—an ethylene/acrylic acid copolymer having a nominal melt index (190° C., 2.16 kg) of 5 g/10 min and an acrylic acid content of 9% sold by Dow under the trade designation Primacor 1430.

EVA-I—an ethylene/vinyl acetate copolymer having a melt index (190° C., 2.16 kg) of 5.0 g/10 mins and a vinyl acetate content of 28%, sold by Atochem under the trade designation Evatane 28:03 (EVATANE is a trade mark).

EVA-II—an ethylene/vinyl acetate copolymer having a nominal melt index (190° C., 2.16 kg) of 2.0 g/10 mins and a vinyl acetate content of 18% sold by Atochem under the trade designation Lacqtene 1020 (LACQTENE is a trade mark).

EVA-III—an ethylene/vinyl acetate copolymer having a nominal melt index (190° C., 2.16 kg) of 3.0 g/10 mins and a vinyl acetate content of 40% sold by Bayer under the trade designation Levapren 400 (LEVAPREN is a trade mark).

TABLE 3

| Example | Polymer Type | Composition (% by wt) | | | LOI |
|---|---|---|---|---|---|
| | | Polymer | Silicone Fluid | CaCO$_3$ | |
| 14 | EMA-I | 65 | 5 | 30 | 36 |
| 15 | EMA-II | 65 | 5 | 30 | 34 |
| 16 | EBA-I | 65 | 5 | 30 | 34 |
| 17 | EAA-I | 65 | 5 | 30 | 33 |
| 18 | EAA-II | 65 | 5 | 30 | 33 |
| 19 | EVA-I | 65 | 5 | 30 | 27 |
| 20 | EVA-I | 60 | 5 | 35 | 28 |
| 21 | EVA-I | 55 | 5 | 40 | 29 |
| 22 | EVA-I | 50 | 5 | 45 | 34 |
| 23 | EVA-II | 50 | 5 | 45 | 29 |
| 24 | EVA-III | 50 | 5 | 45 | 30 |

EXAMPLES 25 AND 26

Two compositions were prepared by blending together the same ethylene/ethyl acrylate copolymer, calcium carbonate and silicone fluid as used in Examples 9 to 13 with a peroxide crosslinking agent Dicup-T. The amount of the crosslinking agent was about 2.5% based on the total weight of the polymer, silicone and calcium carbonate. The proportions of the components are given in Table 4. The LOI of the flame retardant composition was measured before and after crosslinking the composition. The results are also given in Table 4.

TABLE 4

| Example | Composition (% by wt) | | | LOI | |
| --- | --- | --- | --- | --- | --- |
| | Polymer | Silicone Fluid | CaCO$_3$ | Before Cross-linking | After Cross-linking |
| 25 | 52 | 3 | 45 | 29 | 30 |
| 26 | 67 | 3 | 30 | 29 | 29 |

We claim:

1. A flame retardant polymer composition, which is substantially free of halogen compounds and of organometallic salts, said composition comprising:
   (A) an organic polymer, at least 40% by weight of which is a copolymer of ethylene with one or more comonomers selected from the group consisting of C$_1$ to C$_6$ alkyl acrylates, C$_1$ to C$_6$ alkyl methacrylates, acrylic acid, methacrylic acid and vinyl acetate;
   (B) from 0.5 to 100 parts by weight per 100 parts by weight of said organic polymer of a silicone fluid or gum; and
   (C) from 10 to 250 parts by weight per 100 parts by weight of said organic polymer of an inorganic filler which is a compound of a metal of Group IIA of the Periodic Table of Elements, but which is neither a hydroxide nor a substantially hydrated compound.

2. A flame retardant composition as claimed in claim 1 in which the inorganic filler is selected from the group comprising magnesium oxide, magnesium carbonate and calcium carbonate.

3. A flame retardant composition as claimed in claim 1 in which the organic polymer is a copolymer of ethylene with ethyl acrylate.

4. A flame retardant composition as claimed in claim 1 in which the inorganic filler comprises at least 50% by weight calcium carbonate, the balance being a compound of a metal of Group II A of the Periodic Table of Elements which is neither a hydroxide nor a substantially hydrated compound.

5. A flame retardant composition as claimed in claim 1 in which the organic polymer is ethylene/methyl acrylate copolymer, ethylene/ethyl acrylate copolymer, ethylene/butyl acrylate copolymer or ethylene/acrylic acid copolymer.

6. A flame retardant composition as claimed in claim 1 in which the amount of silicone fluid or gum is from 2 to 45 parts by weight per 100 parts by weight of the organic polymer and the amount of the inorganic filler is from 25 to 100 parts by weight per 100 by weight of the organic polymer.

7. A flame retardant composition as claimed in claim 1 in which the silicone fluid or gum is a polydimethylsiloxane.

8. A flame retardant composition as claimed in claim 7 in which the inorganic filler is substantially all calcium carbonate.

9. A flame retardant composition as claimed in claim 8 consisting essentially of:
   (A) ethylene/ethyl acrylate copolymer
   (B) polydimethylsiloxane and
   (C) calcium carbonate.

10. A flame retardant composition as claimed in claim 9 consisting essentially of 2 to 8 percent by weight of polydimethylsiloxane, 15 to 50 percent by weight of calcium carbonate and the balance being an ethylene/ethyl acrylate copolymer.

* * * * *